United States Patent
Wheeler et al.

(10) Patent No.: US 9,300,492 B2
(45) Date of Patent: Mar. 29, 2016

(54) NOTIFICATION FEED ACROSS MULTIPLE CLIENT DEVICES

(71) Applicant: Dropbox, Inc., San Francisco, CA (US)

(72) Inventors: Daniel Lowe Wheeler, San Francisco, CA (US); Pierpaolo Baccichet, San Francisco, CA (US); Maxime Larabie-Bélanger, San Francisco, CA (US); Ryan J. Pearl, San Francisco, CA (US); Tina Wen, San Francisco, CA (US); Tushar Jain, San Francisco, CA (US); Alexander J. Sydell, San Francisco, CA (US); Kyle Patrick Consalus, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 453 days.

(21) Appl. No.: 13/741,210

(22) Filed: Jan. 14, 2013

(65) Prior Publication Data

US 2014/0201289 A1 Jul. 17, 2014

(51) Int. Cl.
| | |
|---|---|
| *G06F 15/16* | (2006.01) |
| *H04L 12/58* | (2006.01) |
| *G06Q 10/10* | (2012.01) |
| *G06F 17/30* | (2006.01) |

(52) U.S. Cl.
CPC .............. *H04L 12/58* (2013.01); *G06F 17/3028* (2013.01); *G06F 17/30165* (2013.01); *G06Q 10/107* (2013.01)

(58) Field of Classification Search
CPC .............. H04L 12/58; G06F 17/30165; G06F 17/3028; G06Q 10/107

USPC .................................................. 709/206, 204
See application file for complete search history.

(56) References Cited

U.S. PATENT DOCUMENTS

| | | | |
|---|---|---|---|
| 6,763,344 B1 * | 7/2004 | Osentoski et al. | |
| 6,795,823 B1 * | 9/2004 | Aklepi ................... G06Q 10/08 707/781 |
| 7,529,685 B2 * | 5/2009 | Davies et al. ..................... 705/3 |
| 8,621,244 B1 * | 12/2013 | Rembert et al. .............. 713/193 |
| 2001/0037379 A1 | 11/2001 | Livnat |
| 2002/0107958 A1 | 8/2002 | Faraldo, II |
| 2004/0019634 A1 | 1/2004 | Van Geldern et al. |
| 2004/0073549 A1 * | 4/2004 | Turkel ................. G06F 17/3046 |

(Continued)

FOREIGN PATENT DOCUMENTS

| | | |
|---|---|---|
| CN | 102932180 A | 2/2013 |
| EP | 1204040 A2 | 5/2002 |

(Continued)

OTHER PUBLICATIONS

International Search Report and Written Opinion mailed Mar. 31, 2014 in PCT/US2013/074461, 13 pages.

*Primary Examiner* — Kostas Katsikis

(74) *Attorney, Agent, or Firm* — Novak Druce Connolly Bove + Quigg LLP

(57) ABSTRACT

Event notifications can be provided to a user across multiple client devices or platforms. If a user takes action on one device, notifications on all devices can be updated to reflect the action. For example, notifications can be indexed by topic and time sequence (or other sequence), and multiple notifications related to the same topic can be consolidated at a server or the client so that current information can be presented to the user.

27 Claims, 8 Drawing Sheets

(56) References Cited

U.S. PATENT DOCUMENTS

| | | | |
|---|---|---|---|
| 2005/0198299 A1* | 9/2005 | Beck et al. .................... 709/226 |
| 2006/0041375 A1* | 2/2006 | Witmer .................. G01C 15/00 |
| | | | 701/532 |
| 2006/0217126 A1* | 9/2006 | Sohm et al. .................... 455/454 |
| 2007/0022174 A1 | 1/2007 | Issa |
| 2008/0104044 A1 | 5/2008 | Kardamilas |
| 2008/0244008 A1* | 10/2008 | Wilkinson ........ G06F 17/30545 |
| | | | 709/205 |
| 2009/0319515 A1* | 12/2009 | Minton ............. G06F 17/30303 |
| 2010/0259380 A1 | 10/2010 | Ohtani |
| 2010/0306212 A1* | 12/2010 | Tsirogiannis ..... G06F 17/30498 |
| | | | 707/759 |
| 2011/0231361 A1* | 9/2011 | Patchava ................. G06F 21/50 |
| | | | 707/602 |
| 2011/0302216 A1* | 12/2011 | D'Angelo et al. ............ 707/802 |
| 2012/0011132 A1* | 1/2012 | Spielthenner ................. 707/750 |
| 2012/0023077 A1* | 1/2012 | Kann et al. ..................... 707/702 |
| 2012/0158837 A1* | 6/2012 | Kaul ............................ 709/204 |
| 2012/0185494 A1* | 7/2012 | Garmon ................. G06Q 30/02 |
| | | | 707/758 |
| 2013/0091229 A1* | 4/2013 | Dunn et al. ................... 709/206 |
| 2014/0082755 A1* | 3/2014 | Doan .............................. 726/32 |
| 2014/0156606 A1* | 6/2014 | Beskales ........... G06F 17/30303 |
| | | | 707/692 |

FOREIGN PATENT DOCUMENTS

| GB | 2491612 A | 12/2012 |
| JP | 2007299151 A | 11/2007 |

\* cited by examiner

| | 502 | 504 | 506 | 508 |
|---|---|---|---|---|
| TOPIC FIELDS (510) | | | | |
| TYPE ID | ShFolderInvite | ShFolderInvite | ShFolderInvite | |
| TARGET OBJECT | VacationPhotos | VacationPhotos | VacationPhotos | |
| TARGET USER | Bob | Bob | Bob | |
| SEQUENCE FIELDS (512) | | | | |
| SERIAL NUMBER | 111368 | 111417 | 111499 | |
| SEND TIME | 01/01/13 00:37:23 | 01/01/13 07:35:30 | 01/01/13 07:48:49 | |
| FEED TIME | 01/01/13 00:37:23 | 01/01/13 07:35:30 | 01/01/13 07:35:30 | |
| CONTENT FIELDS (514) | | | | |
| PAYLOAD | <data> | <data> | <data: accept> | |
| ORIGIN USER | Alice | Bob | Bob | |
| ORIGIN APP | browser | mobile app | mobile app | |
| STATUS | Unread | Read | Invisible | |

FIG. 5

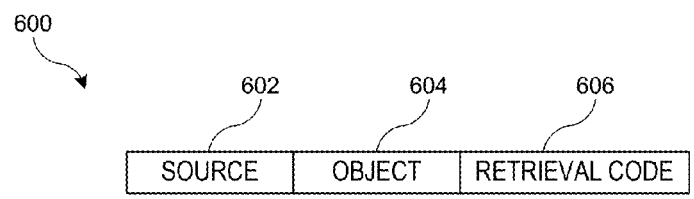

FIG. 6

NOTIFICATION FEED ACROSS MULTIPLE CLIENT DEVICES

BACKGROUND

The present disclosure relates generally to online content management services and in particular to providing notifications from such services to multiple client devices.

Online content management services allow users to access and manage content across multiple devices using the Internet. In a typical online content management service, a user establishes an account with the service provider and to associate various content items with the account. For example, some online content management services may allow the user to store content items (including but not limited to text documents; email messages; text messages; other types of messages; media files such as photos, videos, and audio files; and/or folders containing multiple files) and to selectively allow other users to access the content items. Content items can be stored in a master repository maintained by the service provider and mirrored to or synchronized with local copies on various user devices. Users may also be able to receive updates based on activity of other users; for instance, in a social network, status updates or other content items posted by one user can be propagated to other users who have indicated interest in receiving them.

With the proliferation of mobile computing devices, a user can now access the same online content management service from a variety of clients, such as web browsers, desktop application programs, and mobile-device apps. Keeping all of a user's clients synchronized can present challenges for the online content management service provider.

SUMMARY

Certain embodiments of the present invention relate to providing event notifications to a user across multiple client devices or platforms. In some embodiments, a notification feed can include a stream or sequence of messages reporting the occurrence of various events, such as when the user is invited to join a shared content repository or group, when the user accepts (or declines) such an invitation, or when activities involving the user's account are detected (e.g., changes to security settings such as a password, billing errors, exceeding a quota, or the like). If a user takes action on one device, notifications on all devices can be updated to reflect the action.

The notification feed can be a flexible feed, with notification information that is presented to the user (also referred to herein as "alerts") being updated approximately in real time to reflect current status, e.g., by replacing obsolete information with current information as new events occur. In some embodiments, a flexible feed can be implemented by structuring each notification to include a topic identifier, as well as sequencing information and content. Given a list of notifications, the server and/or a client can use the topic identifier to identify multiple notifications that pertain to the same topic. Where multiple notifications include the same topic, a client can use the temporal sequencing information to determine which notifications should be presented as alerts to the user; for example, older notifications can be hidden from the user. In some embodiments, the server can use the temporal information to determine that certain notifications need not be sent to a particular client, e.g., in cases where a notification that has not yet been sent has already been superseded by a subsequent event.

Certain aspects of the invention relate to servers and methods executable at servers. For example, a server can receive event information pertaining to an event associated with a target user and create a first notification record in a notifications data store based on the event information. The first notification record can include a topic field, a sequence field, and a content field. The server can also generate a first message indicating that the first notification record is available. The first message can include an identifier of the target user and an identifier of the first notification record. The server can promulgate the first message to clients associated with the target user, and the message can be promulgated to each of the clients independently of promulgation to any other of the clients.

As another example, a server can receive a request for new notification records from a client. The server can retrieve, from a notifications data store, an initial set of notification records responsive to the request and can generate a final set of notification records from the initial set of notification records. For example, in generating the final set, the server can determine, based on a topic field of a first notification record in the initial set, whether the first notification record should be consolidated with another notification record in the set; if so, the server can consolidate the records. This consolidation can be accomplished without affecting any records in the notifications data store. The final set of notification records can be sent to the requesting client.

Certain aspects of the invention relate to clients and methods executable at clients. For example, a client can request notification records from a server and can receive, from the server, one or more notification records responsive to the request. The client can identify an initial set of notification records to process, with the initial set including the notification records received from the server; in some instances, the initial set may also include notification records that were present at the client prior to making the request to the server. The client can generate a final set of notification records from the initial set of notification records. For example, the client can determine, based on a topic field of a first notification record in the initial set, whether the first notification record should be consolidated with another notification record in the initial set; if so, the client can consolidate the records. Based on the final set of notification records, the client can present one or more alerts to a user.

The following detailed description together with the accompanying drawings will provide a better understanding of the nature and advantages of the present invention.

BRIEF DESCRIPTION OF THE DRAWINGS

FIG. 5 shows examples of notification records according to an embodiment of the present invention.

FIG. 6 shows a generalizable data structure that can be used for messages according to an embodiment of the present invention.

DETAILED DESCRIPTION

Certain embodiments of the present invention relate to providing event notifications to a user across multiple client devices or platforms. In some embodiments, a notification feed can include a stream or sequence of messages reporting the occurrence of various events, such as when the user is invited to join a shared content repository or group, when the user accepts (or declines) such an invitation, or when activities involving the user's account are detected (e.g., changes to security settings such as a password, billing errors, exceeding a quota, or the like). If a user takes action on one device, notifications on all devices can be updated to reflect the action.

The notification feed can be a flexible feed, with notification information that is presented to the user (also referred to herein as "alerts") being updated approximately in real time to reflect current status, e.g., by replacing obsolete information with current information as new events occur. In some embodiments, a flexible feed can be implemented by structuring each notification to include a topic identifier, as well as temporal sequencing information and content. Given a list of notifications, the server and/or a client can use the topic identifier to identify multiple notifications that pertain to the same topic. Where multiple notifications include the same topic, a client can use the temporal sequencing information to determine which notifications should be presented as alerts to the user; for example, older notifications can be hidden from the user. In some embodiments, the server can use the temporal information to determine that certain notifications need not be sent to a particular client, e.g., in cases where a notification that has not yet been sent has already been superseded by a subsequent event.

Figure 1:
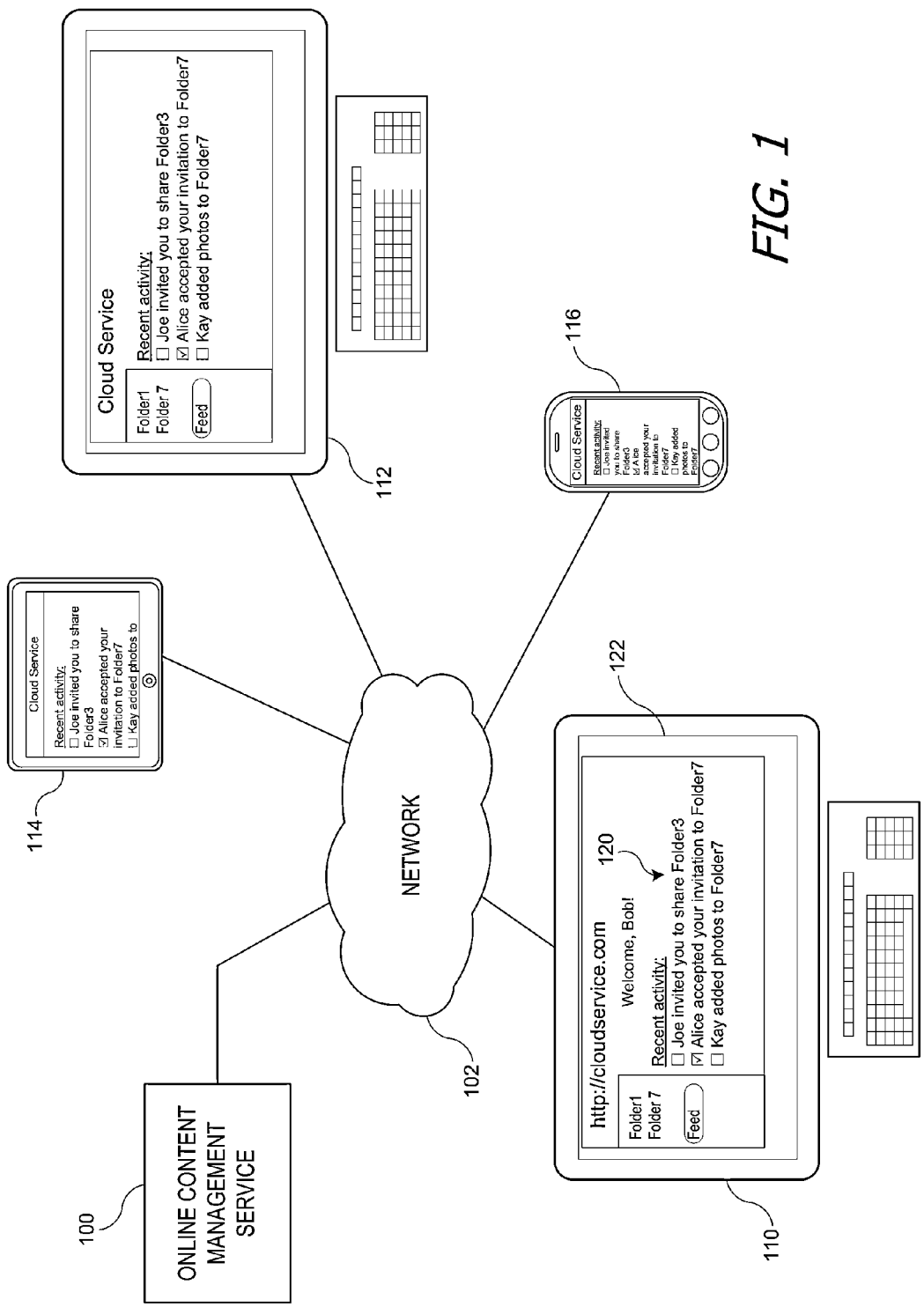
FIG. 1 shows clients accessing an online content management service according to an embodiment of the present invention.

FIG. 1 shows clients accessing an online content management service 100 according to an embodiment of the present invention. Online content management service 100 can include, for example, a file storage service, a file sharing service, a social media service that allows users to post messages and/or other content, and so on. Online content management service 100 can be hosted on servers maintained by a service provider and accessed via a network 102, such as the Internet.

Users can access online content management service 100 by operating various clients 110, 112, 114, 116. As used herein, a "client" refers generally to a combination of computer hardware and software that enables a user to interact with online content management service 100. For example, client 110 can be a desktop or laptop computer executing a web browser (e.g., Internet Explorer, Google Chrome, or Safari) that communicates with online content management service 100 using web protocols such as HTTP (Hypertext Transfer Protocol). Client 112 can be a desktop or laptop computer executing an application program provided by the provider of online content management service 100. In some instances where the online content management service provides access to files, the application program may allow files hosted on a server to appear to exist within a filesystem structure associated with the client computer's operating system. It should be noted that in some instances the same client computer can execute both a web browser and a desktop application program; accordingly, it is to be understood that a single physical device can implement one or more clients.

Other examples of clients include mobile devices, e.g., tablet computer 114 and mobile phone 116, which can execute application programs (also referred to as "apps") that communicate with online content management service 100. At various times, a user may be interacting with one or more of clients 110, 112, 114, 116.

In some embodiments, online content management service 100 can provide notifications of events that may be of interest to the user and/or to the client(s). As used herein, an "event" can include any type of activity associated with the user. For instance, if the user has access to a shared folder that contains files and another user modifies a file in the shared folder, online content management service 100 can provide a notification. As another example, a second user may offer the user an opportunity to share content, e.g., by inviting the user to "join" a shared folder created or managed by the second user. In some embodiments, event notifications are provided to all clients 110, 112, 114, 116 associated with the user, regardless of which platform(s) the user is currently interacting with.

Subsequently to being notified of an event, the notified user (or another user) may take action with regard to the event, and this action may constitute another event. For example, in response to receiving an invitation to join a shared folder, the user may accept or decline the invitation, or the inviting user may withdraw the invitation before the recipient user can accept. These actions may constitute further events for which notifications can be generated.

As used herein, a "notification" refers generally to event-related information provided by a service to one or more clients. In some embodiments, the client may make some or all of its received notifications visible (or perceptible) to the user. For example, the client may display a visual indicator that a notification has been received, display text descriptive of the notification (e.g., "Joe invited you to share Folder3"), play a sound, vibrate, speak words descriptive of the notification, and so on. The term "alert" is used herein to refer to a user-visible (perceptible) form of a notification.

In some embodiments, in addition to or instead of individual event notifications, any or all of clients 110, 112, 114, 116 can provide a notification feed to the user. As used herein, a "notification feed" (or simply a "feed") is a list of event-related alerts. An example feed 120 is shown in display 122 of client 110. The feed can be a chronologically ordered listing of alerts and can include various indicia to inform the user as to the content and/or status of each notification. The feed can be a "flexible" feed in which notifications pertaining to the same topic are consolidated, or folded, e.g., so that the feed presents only the most recent notification related to the same topic. By way of illustration, feed 120 includes an alert that "Joe invited you [user Bob] to share Folder3." If user Bob accepts Joe's invitation, feed 120 can be updated to hide the replace the displayed alert with "You accepted Joe's invitation to share Folder3," or the displayed alert can be hidden. As another example, as a user Kay uploads photos to a shared folder, each new photo may generate an event notification, while feed 120 presents a single alert such as "Kay uploaded photos to Folder7." Examples of techniques that can be used to consolidate notifications are described below.

A feed can be presented on any or all of clients 110, 112, 114, 116, and the feeds presented on different clients can be synchronized or coordinated. For example, online content management service 100 can "push" notifications to clients 110, 112, 114, 116.

Figure 2:
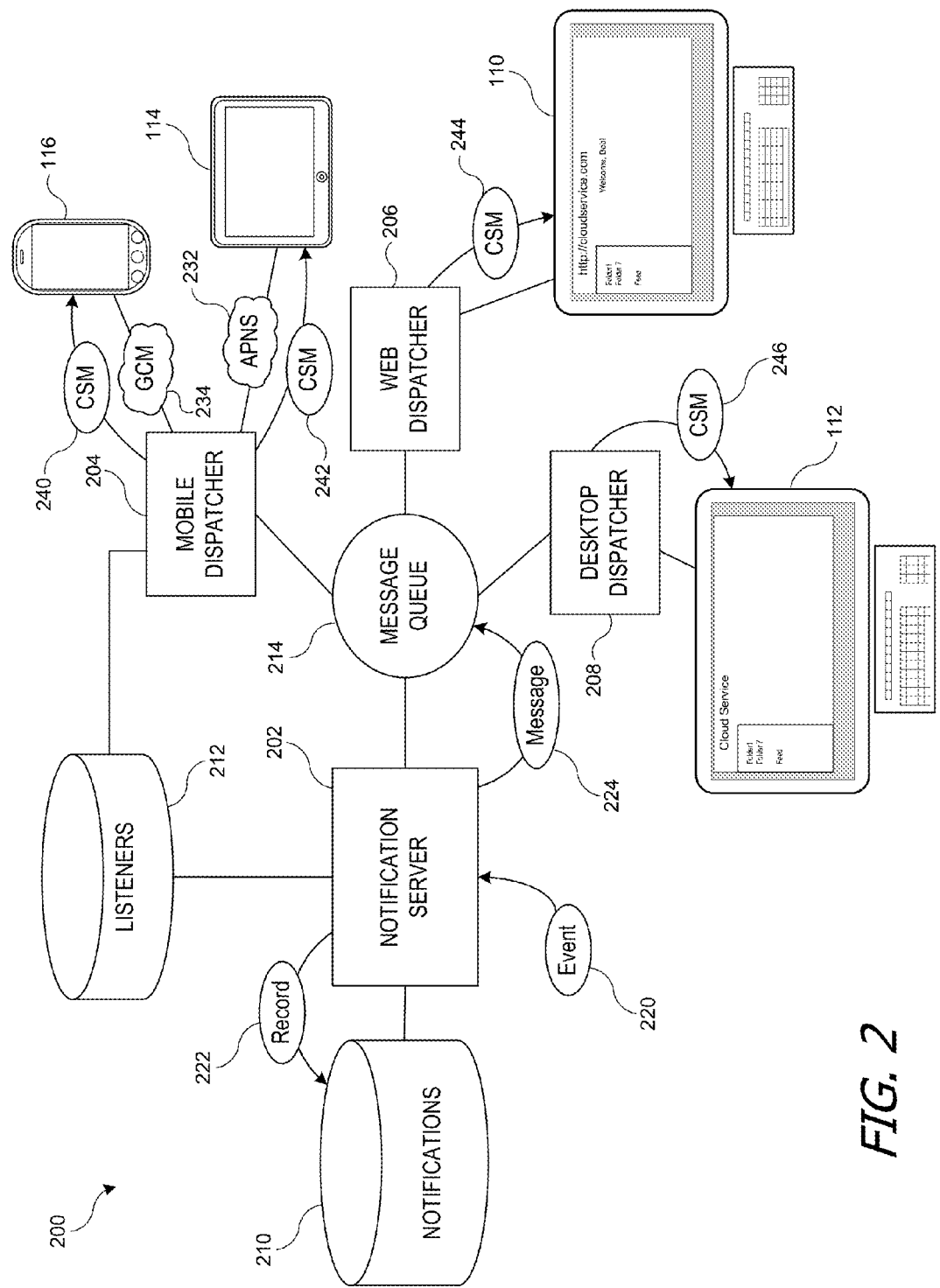
FIG. 2 shows a system for pushing notifications to clients according to an embodiment of the present invention.

FIG. 2 shows a system 200 for pushing notifications to clients 110, 112, 114, 116 according to an embodiment of the present invention. System 200 includes a notification server 202, mobile dispatcher 204, web dispatcher 206, and desktop dispatcher 208, all of which can be implemented on servers (or other computer systems) maintained and/or operated by a provider of online content management service 100 of FIG. 1. Server 202 is communicably coupled to a notifications data store 210. Server 202 also maintains a message queue 214 that is accessible by mobile dispatcher 204, web dispatcher 206, and desktop dispatcher 208.

Notification server 202 can perform operations related to generating event notifications and promulgating these notifications to clients, examples of which are described below. In some embodiments, notification server 202 can be implemented as one or more software (code) modules executing on suitable computer hardware, such as a server. In some instances, notification server 202 can be physically or logically distinct from other servers that perform operations related to other aspects of the online content management service such as content management (e.g., file storage and retrieval) and/or user account management (e.g., creating and updating user accounts, billing, etc.).

Listeners data store 212, which can be implemented, e.g., using a database or any other data storage technology and a suitable computer-readable storage medium, can include information identifying specific client devices and/or clients associated with a particular user. For example, a particular user with the username "Bob" may have a desktop application program installed on his home computer (e.g., client 112), a web browser client operating on his home computer or another computer (e.g., client 110), a tablet running the iOS operating system (a product of Apple Inc.) (e.g., client 114), and a mobile phone running the Android operating system (a product of the Open Handset Alliance) (e.g., client 116). Listeners data store 212 can provide identifying information for each of these clients when queried with the username "Bob." Listeners data store 212 can be populated by the online content management service based on communications from various clients; for example, when Bob first signs in to the online content management service from a particular client, notification server 202 (or another server associated with the online content management service) can create a record in listeners data store 212 associating Bob with that client.

Notification server 202 can be capable of detecting an event for which a notification should be generated. In some embodiments, events can be detected based on event information 220 sent to notification server 202 by other servers associated with the online content management service. Thus, for example, a user account server or a content management server can send event information 220 to notification server 202 based on activity occurring at those servers. Examples of events and associated information are described below with reference to FIG. 4.

Notification server 202 can generate a notification record 222 based on event information 220 and store notification record 222 in notifications data store 210, which can be implemented, e.g., using a database or any other data storage technology and a suitable computer-readable storage medium. Notification record 222 can include a row in a database table, or any structured data object, that represents event information 220 in a manner that makes a particular notification readily retrievable by server 202 in response to a request from a client. An example structure for notification record 222 is described below with reference to FIG. 5.

Notification server 202 can also promulgate messages to clients to inform the clients when a notification record is added to data store 210. In some embodiments, notification server 202 generates a message 224 corresponding to notification record 222 and adds message 224 to message queue 214. Message 224 can, but need not, contain the actual information in notification record 222; in some embodiments, message 224 can simply indicate the existence of a notification record 222 and provide information usable to route message 224 to a client and to allow a receiving client to retrieve notification record 222 from data store 210. For example, message 224 can include an identifier of the user for whom the message is intended and an identifier of record 222. An example structure for message 224 is described below with reference to FIG. 6.

Delivery of a promulgated message 224 to a client can be accomplished in a client-specific manner, using dispatchers such as mobile dispatcher 204, web dispatcher 206, and desktop dispatcher 208, each of which can independently detect new message 224 in message queue 226 and push a corresponding client-specific message (CSM) 240, 242, 244, 246 to clients using appropriate technologies. Client-specific messages 240, 242, 244, 246 can be (but need not be) identical in structure and/or content to message 224. The format and content of a particular client-specific message can be adapted to the delivery protocol used for that client. As long as the client-specific message includes reference information usable to locate the corresponding notification record in notifications data store 210, a client will be able to retrieve the notification record as described below.

For example, mobile platforms such as tablet computers and mobile phones can rely on push notification services associated with their operating systems to deliver client-specific messages to specific devices. Examples of push notification services include Apple Push Notification Service (APNS), operated by Apple Inc. and associated with devices running the iOS operating system, and Google Cloud Messaging (GCM), operated by Google, Inc., and associated with devices running the Android operating system.

Some push notification services require that the source of a message to a client provide an identifier of the destination device and the content of the message. Accordingly, in some embodiments, when mobile dispatcher 204 detects a new message 224 in message queue 214, mobile dispatcher 204 can extract a user identifier from message 224. Mobile dispatcher 204 can query listeners data store 212 using the user identifier to determine which (if any) mobile devices are associated with the user identifier. Based on the information from listeners data store 212, mobile dispatcher 204 can generate one or more push notifications (represented as client-specific messages 240, 242), e.g., by communicating with APNS (represented as cloud 232), GCM (represented as cloud 234), or other push notification services as appropriate for a particular mobile device.

Web dispatcher 206 can deliver client-specific message 244 (e.g., via the Internet (not explicitly shown)) to active web clients, such as client 110, using technologies such as long pulling.

Desktop dispatcher 208 can deliver client-specific message 246 (e.g., via the Internet) to active desktop clients, such as client 112. Various techniques can be used depending on the specific communication protocols established between desktop client 112 and the online content management service; examples include long pulling, polling of dispatcher 208 by the desktop client, HTTP server push, and so on.

Each dispatcher 204, 206, 208 can independently scan message queue 214 and identify messages that it has not yet processed. In some embodiments, dispatchers 204, 206, 208 do not remove messages from message queue 214; instead, queue 214 can be managed as a FIFO (first-in, first-out) queue, with each dispatcher independently keeping track of its current read location within the queue, so that each dispatcher can read all messages in chronological order. Consequently, each dispatcher 204, 206, 208 can push out every message in queue 214 to appropriate clients, and all clients associated with a particular user can receive all messages for that user.

In some embodiments, message queue 214 can be periodically purged of old messages (e.g., messages can expire after some fixed time period such as a day or a week) and/or messages that are known to have been processed by all of dispatchers 204, 206, 208.

In response to receiving a client-specific message (e.g., one of messages 240, 242, 244, 246) corresponding to message 224, the receiving client can request the corresponding notification record 222 from notification data store 210, e.g., by sending a request to server 202 or another server (not shown), using information contained in the received client-specific message to identify the record of interest.

Figure 3:
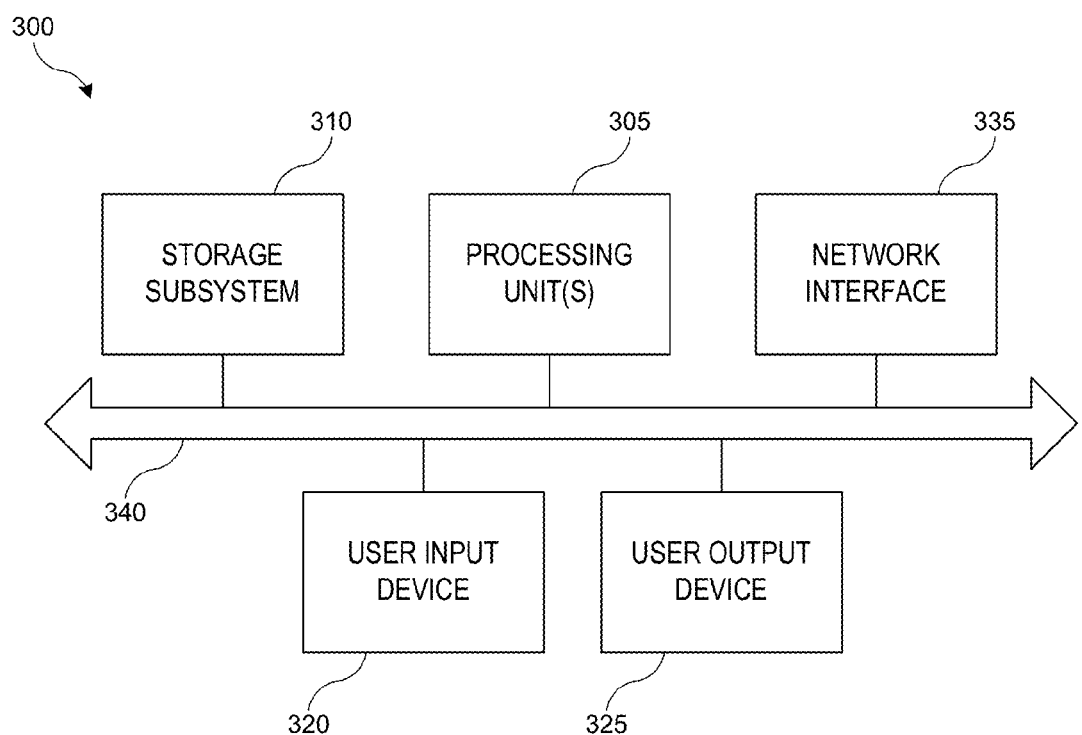
FIG. 3 shows a simplified block diagram illustrating a representative computer system.

Various operations described herein can be implemented on computer systems, which can be of generally conventional design. FIG. 3 is a simplified block diagram illustrating a representative computer system 300. In various embodiments, computer system 300 or similar systems can implement a client (e.g., any of platforms 110, 112, 114, 116) or a server (e.g., server 200).

Computer system 300 can include processing unit(s) 305, storage subsystem 310, input devices 320, output devices 325, network interface 335, and bus 340.

Processing unit(s) 305 can include a single processor, which can have one or more cores, or multiple processors. In some embodiments, processing unit(s) 305 can include a general-purpose primary processor as well as one or more special-purpose co-processors such as graphics processors, digital signal processors, or the like. In some embodiments, some or all processing units 305 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 305 can execute instructions stored in storage subsystem 310.

Storage subsystem 310 can include various memory units such as a system memory, a read-only memory (ROM), and a permanent storage device. The ROM can store static data and instructions that are needed by processing unit(s) 305 and other modules of electronic device 300. The permanent storage device can be a read-and-write memory device. This permanent storage device can be a non-volatile memory unit that stores instructions and data even when computer system 300 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 305 need at runtime.

Storage subsystem 310 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 310 can store one or more software programs to be executed by processing unit(s) 305, such as an operating system, a browser application, a mobile app for accessing an online content management service, a desktop application for accessing the online content management service, and so on. "Software" refers generally to sequences of instructions that, when executed by processing unit(s) 305 cause computer system 300 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 305. Software can be implemented as a single program or a collection of separate programs or program modules that interact as desired. From storage subsystem 310, processing unit(s) 305 can retrieve program instructions to execute and data to process in order to execute various operations described herein.

A user interface can be provided by one or more user input devices 320 and one or more user output devices 325. Input devices 320 can include any device via which a user can provide signals to computing system 300; computing system 300 can interpret the signals as indicative of particular user requests or information. In various embodiments, input devices 320 can include any or all of a keyboard, touch pad, touch screen, mouse or other pointing device, scroll wheel, click wheel, dial, button, switch, keypad, microphone, and so on.

User output devices 325 can include any device via which computer system 300 can provide information to a user. For example, user output devices 325 can include a display to display images generated by computing system 300. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 325 can be provided in addition to or instead of a display. Examples include indicator lights, speakers, tactile "display" devices, printers, and so on.

Network interface 335 can provide voice and/or data communication capability for computer system 300. In some embodiments, network interface 335 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), GPS receiver components, and/or other components. In some embodiments, network interface 335 can provide wired network connectivity (e.g., Ethernet) in addition to or instead of a wireless interface. Network interface 335 can be implemented using a combination of hardware (e.g., antennas, modulators/demodulators, encoders/decoders, and other analog and/or digital signal processing circuits) and software components.

Bus 340 can include various system, peripheral, and chipset buses that communicatively connect the numerous components of computing system 300. For example, bus 340 can communicatively couple processing unit(s) 305 with storage subsystem 310. Bus 340 can also connect to input devices 320 and output devices 325. Bus 340 can also couple computing system 300 to a network through network interface 335. In this manner, computing system 300 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 305 can provide various functionality for computing device 300. For example, in a mobile computing device, processing unit(s) 305 can execute an operating system capable of receiving push notifications and an app to communicate with online content management service 100. In a desktop computing device, processing unit(s) 305 can execute an operating system and a desktop application program that presents an interface to online content management service 100; in some embodiments, this interface may be integrated with an interface to a filesystem maintained by the operating system. In some embodiments, processing unit(s) 305 can execute a browser application that provides the ability to retrieve and display content items from sources such as online content management service 100 (e.g., using HTTP or other data transfer protocols to retrieve and display web pages) and the ability to receive and interpret user input pertaining to the content items, such as selection of an item to view, submission of data by the user in response to a particular content item (e.g., filling out a form on an interactive web page), and so on.

In some embodiments, computer system 300 or a similar system can also implement notifications server 202 and/or dispatchers such as mobile dispatcher 204, web dispatcher 206, or desktop dispatcher 208. In such instances, a user interface may be located remotely from processing unit(s) 305 and/or storage subsystem 310; similarly, storage subsystem 310 or portions thereof may be located remotely from processing unit(s) 305. Accordingly, in some instances, various components of computer system 300 need not be physically located in any particular proximity to each other.

It will be appreciated that computer system 300 is illustrative and that variations and modifications are possible. Computer system 300 can have other capabilities not specifically described here (e.g., mobile phone, global positioning system (GPS), power management, one or more cameras, various connection ports for connecting external devices or accessories, etc.). Further, while computer system 300 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

As described above with reference to FIG. 2, system 200 operates to notify clients of various events, where an event can include any of a number of possible occurrences. In some embodiments, events of various kinds can be identified by reference to a hierarchical taxonomy.

Figure 4:
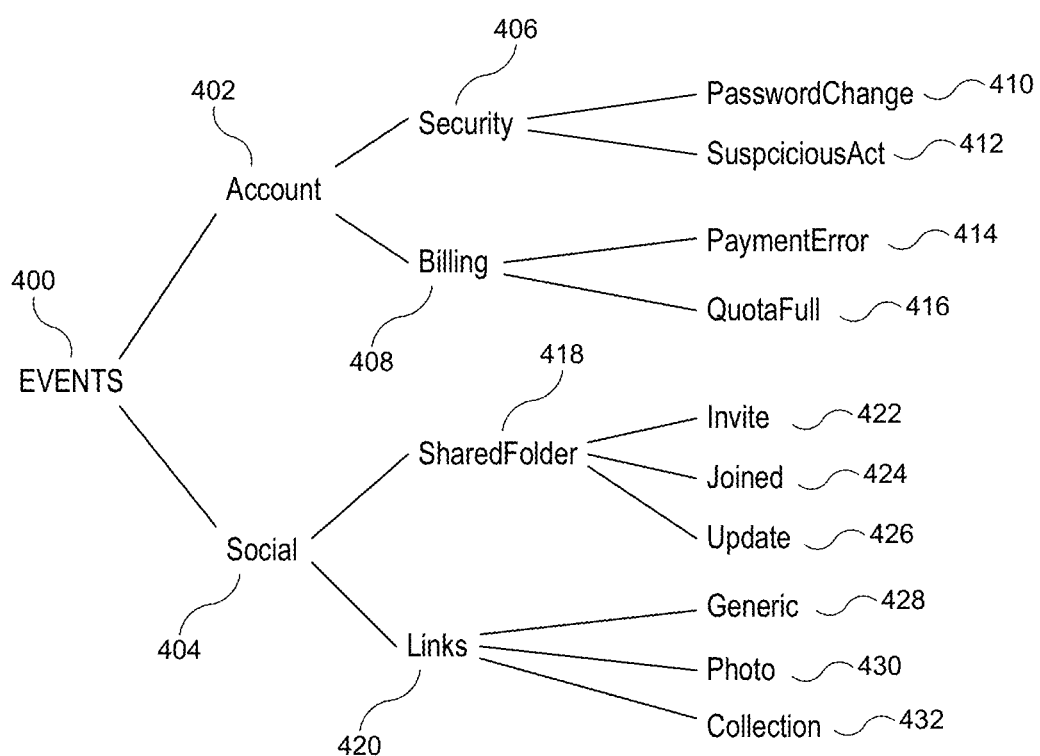
FIG. 4 shows an event taxonomy according to an embodiment of the present invention.

FIG. 4 shows an event taxonomy according to an embodiment of the present invention. In this example, events (node 400) can be classified at a first level based on whether they relate to an account (node 402) or social activity (node 404). Account-related events at node 402 can be further classified at a second level based on whether they relate to security (node 406) or billing (node 408). Security events at node 406 can be further classified into specific events such as password changes (leaf node 410) and suspicious activity suggesting a user's account may be compromised or under attack (leaf node 412). Similarly, billing events at node 408 can be further classified into specific events such as payment errors (leaf node 414) and quota full (leaf node 416).

Similarly, social-activity events at node 404 can be further classified at a second level based on whether they relate to shared folders (node 418) or link sharing (node 420). Shared-folder events at node 418 can be further classified into specific events such as an invitation (leaf node 422), joining (leaf node 424), and updating (leaf node 426). Link-sharing events at node 420 can be further classified into specific events such as sharing a generic file link (leaf node 428), sharing a photo link (leaf node 430), and sharing a collection (such as a link to a folder) (leaf node 432).

In some embodiments, each event can be assigned a hierarchically structured event identifier representing its location in the taxonomy; for example, a quota-full event can have an event identifier 402-408-416. Other rules for assigning event identifiers can also be used.

It will be appreciated that the event taxonomy and specific events shown in FIG. 4 are illustrative and that variations and modifications are possible. An event taxonomy can include any number of levels (including the degenerate case of a single level), and any number of nodes can be present at each level. In some embodiments, an event taxonomy can be used to filter notifications, e.g., for purposes of determining what alerts to present to the user, for organizing the presentation of alerts, or for facilitating search of notifications data store 210.

As described above, notification server 202 can generate and store notification records 222. FIG. 5 shows examples of notification records 222 according to an embodiment of the present invention. In this example, each notification record 222 has a structure shown at column 502. Columns 504, 506, 508 provide examples of notification records having this structure.

In this example, notification records are structured to facilitate sorting and/or filtering by topic and time. For instance, topic fields 510 can include one or more fields that, taken together, provide information indicating the subject matter of the notification record. In this example, topic fields 510 include an event type identifier, which can be a node identifier from the hierarchy of FIG. 4; a target object, which can be an identifier of a file or folder to which the event pertains; and a target user, which can be the user whose clients are to receive the notification. In each of columns 504, 506, 508, the topic fields indicate that the notification pertains to the same topic: a shared folder invitation for a folder called "VacationPhotos" to user Bob. As described below, in some embodiments topic fields 510 can be used as a key to identify notification records for consolidation.

Sequence fields 512 provide information usable to sort order notification records into a logical sequence. In some embodiments, the sorting can be based on time, and sequence fields 512 can provide time-based information usable to sort notification records into a temporal sequence. For example, for purposes of identifying specific records, notification server 202 can assign a serial number to each notification record as it is generated; in some embodiments, serial numbers can be generated in a monotonically increasing sequence. In some embodiments, the serial number can be unique across all messages in notifications data store 210, and a particular notification record can be located by reference to its serial number. In other embodiments, the serial number can be unique across all messages having the same target user, and a particular notification record can be located by reference to the target user ID and serial number.

Sequence fields 512 can also include one or more time stamps. In this example, a send time is included. The send time can reflect the time when server 202 generated the notification record and/or when server 202 generated the corresponding message 224 for message queue 214. In this example, a "feed time" is also included. The feed time can reflect a time reference established by the source of the underlying event (e.g., a particular client or server). For example, if a client takes action responsive to a first event, the second notification record can have a feed time that matches the feed time of the first notification record. In some embodiments, clients or other sources that report events are permitted to specify a feed time to be associated with the corresponding notification record, and server 202 can impose limits on allowable feed times, such as a rule specifying that the feed time can be no later than the send time (which is determined by server 202).

Other time fields (not shown) can also be included. For example, an event time field can be used to indicate when the event that led to creation of the notification record occurred.

Content fields 514 can provide further details related to the event. For example, content fields 514 can include a payload field, an originating user field, an originating application field, and a status field. The payload field can include event-specific data. In some embodiments, the payload field can be formatted as a key/value dictionary, with particular combinations of keys and values being prescribed for particular events. For example, if a user accepts or declines an invitation, the payload can include a key-value pair indicating whether the invitation was accepted or declined. The originating user field can identify a user who took the action that resulted in the event, e.g., in the case of an invitation, the originating user can be the user who issued the invitation. The originating app can identify the particular application or platform from which the action was taken.

The status field can indicate a status associated with the notification. In some embodiments, the status field can be an enumerated type corresponding to different states of the notification record. For instance, the enumerated values can include {unread, read, invisible}. In this example, "unread" indicates that the user is (probably) not yet aware of the event (or the notification); "read" indicates that the user is aware of the underlying event (or the notification); and "invisible" indicates that some action has occurred making the underlying event (or the notification) obsolete. In some embodiments, when a notification is acted on by a client, a new event is generated with an updated status field (and possibly other updated content fields).

The status field can be used by server 202 and or any or all of clients 110, 112, 114, 116 when processing multiple notifications associated with the same topic. By way of specific example, suppose that a user (Alice) invites user Bob to share a folder Alice has created called "VacationPhotos." When Alice sends the invitation, this first event can result in creation of notification record 504 by notification server 202. The event topic indicates that the event pertains to a shared-folder invitation for folder VacationPhotos and is directed to Bob. The content fields identify Alice as the originating user and the status as unread, since server 202 has not received information indicating that Bob has read the invitation. It is to be understood that generation of notification record 504 can be separate from sending an invitation to Bob. For example, online content management service 100 may send an email or other message to Bob's inbox containing the actual invitation; notification server 202 provides an independent pathway for notifying Bob's clients that Bob has an invitation awaiting his attention.

Subsequently, Bob may read the invitation, either as a result of seeing an alert generated by one or more of his clients based on notification record 504 or independently of any alerts. For example, Bob may happen to check his inbox and see the invitation. When Bob reads the invitation, this second event can result in creation of notification record 506 by notification server 202. The topic fields can be the same as for notification record 504, since the second event also pertains to the invitation from Alice to share the VacationPhotos folder. The time fields are different, reflecting that Bob's reading the invitation is a separate event, and the originating user and application can also be different because in this instance Bob's client would be the source of the event. The status is identified as read, indicating that Bob has now read the invitation.

At some point after reading the invitation, Bob may decide to accept it. When Bob accepts the invitation, this third event can result in creation of notification record 508 by notification server 202. The topic fields can be the same as for notification records 504 and 506, since the third event also pertains to the invitation from Alice to share the VacationPhotos folder. The time fields are later, reflecting that accepting the invitation occurs after reading it. The content fields can include a payload indicating that Bob accepted the invitation (as opposed to declining it) and that Bob's client is again the source of the event. The status is identified as invisible, indicating that the notification is likely no longer of interest to Bob.

In this example, each event results in generation of a new notification record rather than updating an existing record. As described below, this mechanism allows clients to provide notification feeds that can be dynamically updated to better reflect current status.

Referring again to FIG. 2, when a notification record 222 is created, server 202 adds a corresponding message 224 to message queue 214. Message 224 can, but need not, include the same information as notification record 222. In some embodiments, message 224 can instead provide information that is usable by a client to retrieve the corresponding notification record 222.

FIG. 6 shows a generalizable data structure 600 that can be used for messages 224 according to an embodiment of the present invention. Data structure 600 includes a source field 600, an object field 602, and a retrieval code field 604. Notification server 202 can use structure 600 for messages 224.

Source field 600 can be used to identify notification server 202 (the source of message 224); object field 602 can be used to identify the target user; and retrieval code field 604 can be used to provide the serial number of the message (see FIG. 5). As described above, a message recipient (a client device) can use the serial number from field 604, either alone or in combination with the target user identifier from field 602, to retrieve the corresponding notification record 222 from notifications data store 210.

More generally, data structure 600 can be used for messages from different sources and/or directed to different destinations; structure 600 is not limited to messages to clients indicating that a notification is available. For example, in some embodiments, updates to files stored on the online content management service are logged in a server file journal, and messages related to file updates can identify the server file journal as the source, a namespace associated with the updated file as the object, and a serial number assigned to the serial file journal entry as the retrieval code. Such file-update messages can be exchanged between different clients, e.g., to allow different clients to synchronize data, or between a server and a client, e.g., to allow clients to synchronize local copies of files with master copies maintained by the server.

In some embodiments, the provider of the online content management service may not have control over delivery of messages 224 to clients. For example, push notifications to mobile devices may use unsecured channels and may be subject to interception by interlopers. Where data structure 600 does not include the actual notification content, the potential for harm to a user (e.g., exposure of sensitive data) due to message interception is reduced. An authorized client that receives a message conforming to data structure 600 can access server 202 via a secure channel to retrieve the content of the notification record; unauthorized clients can be prohibited from retrieving notification records.

The data structures of FIGS. 5 and 6 are illustrative, and variations and modifications are possible. A notification record can include any number of fields and can have more or fewer fields than shown. Similarly, the number and content of fields of a message can be different from that shown.

Using data structures such as those of FIGS. 5 and 6, system 200 of FIG. 2 can coordinate notifications across clients associated with a particular user and can allow all clients to present dynamic notification feeds to an associated user, regardless of which client (or clients) the user might be actively operating at any given time. Examples of processes that can be implemented at notification server 202 and clients 110, 112, 114, 116 to provide a client notification service will now be described.

Figure 7:
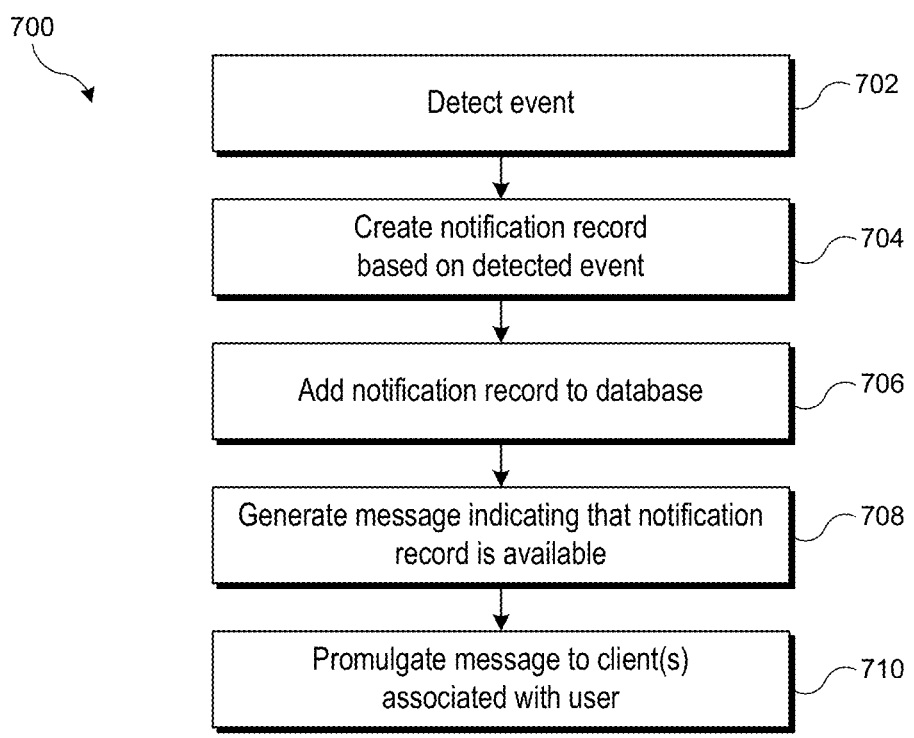
FIG. 7 shows a flow diagram of a process for pushing event notifications to clients associated with a user according to an embodiment of the present invention.

FIG. 7 is a flow diagram of a process 700 for pushing event notifications to clients associated with a user according to an embodiment of the present invention. Process 700 can be implemented on a server, e.g., notification server 202.

At block 702, notification server 202 can detect an event. For example, server 202 can receive event information 220 from another server or from a client. At block 704, notification server 202 can generate a notification record 222 based on the detected event; data structure 500 of FIG. 5 or another data structure can be used. In some embodiments, notification server 202 can apply decision rules to determine whether a notification record should be generated in response to a particular event. For example, users may be able to opt out of receiving all notifications or certain types of notifications, and notification server 202 can determine whether the user has opted out. User options can also be implemented at later stages of processing, e.g., as described below.

At block 706, notification server 202 can add notification record 222 to notifications data store 210. At block 708, notification server 202 can generate a message 224 indicating that notification record 222 is available; data structure 600 of FIG. 6 or another data structure can be used.

At block 710, notification server 202 can promulgate message 224 to clients associated with the user. In some embodiments, promulgating message 224 can include adding message 224 to message queue 214, which is periodically read by various dispatchers 204, 206, 208, which in turn can push the message to the clients as described above. In some embodiments, all messages for a given user are promulgated to all of that user's clients. In other embodiments, promulgation can be more selective. For example, a user may opt out of receiving notifications on some but not all of his clients, and dispatchers 204, 206, 208 can implement the user preferences. It is to be understood that promulgating a message 224 to a particular client can but need not result in a user-visible alert on that client; user preferences related to presenting alerts can be implemented within the client to suppress some or all alert messages.

Process 700 can be repeated for each event the server detects. Accordingly, each event can result in a separate notification record being added to notifications data store 210. In some embodiments, notification records are not deleted from notifications data store 210. In other embodiments, notification records can be deleted, e.g., via a periodic purge of stale notifications as determined based on send time. For example, notifications can be kept for a fixed period of time, e.g., a day or a week or a month, after which they are presumed to be no longer of interest and deleted. More complex rules for purging notifications data store 210 can be used, such as rules based on event type or notification topic. For example, notifications related to payment errors may be preserved until the error is resolved, while notifications about shared-folder invitations received or accepted may be deleted after some fixed period of time.

Figure 8:
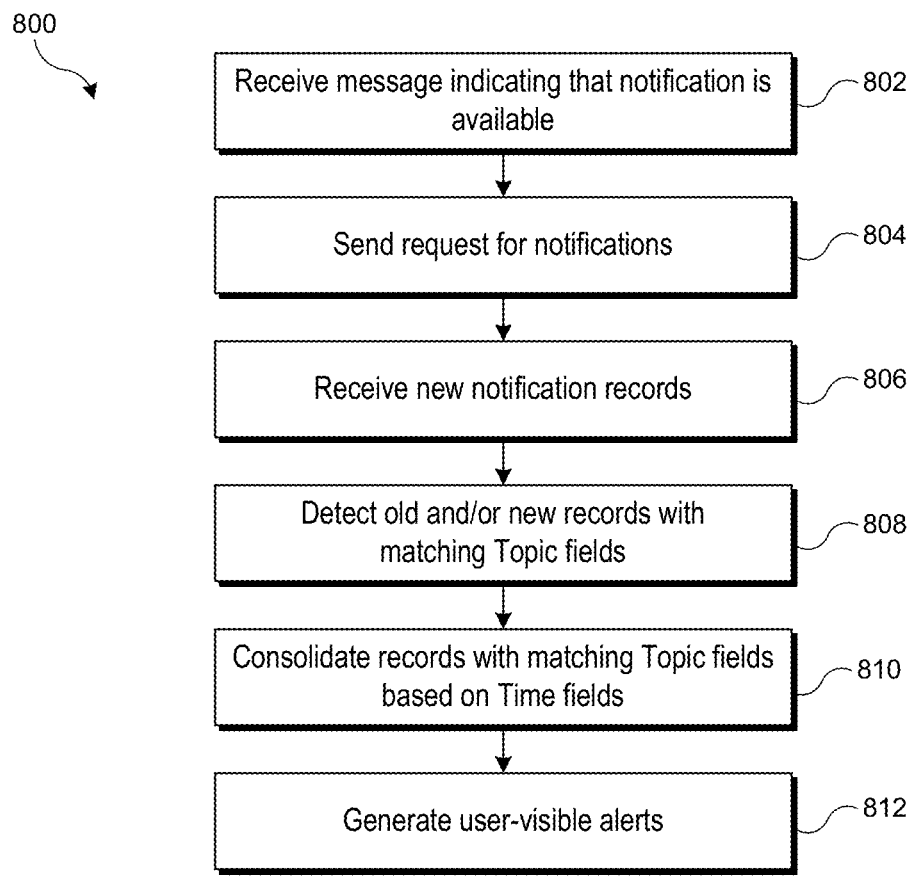
FIG. 8 shows a flow diagram of a process for providing notifications to a user according to an embodiment of the present invention.

FIG. 8 is a flow diagram of a process 800 for providing notifications to a user according to an embodiment of the present invention. Process 800 can be implemented, e.g., on client 116 or any of clients 110, 112, 114.

At block 802, client 116 can receive a message indicating that a notification is available. This message can be the message 224 that was promulgated by server 202 at block 710 of process 700. At block 804, client 116 can send a request to notification server 202 for the corresponding notification record.

In some embodiments, client 116 can request notification records in real time as messages are received. In other embodiments, client 116 may wait and request notification records at any subsequent time. Accordingly, it is possible that multiple messages can be promulgated by server 202 and/or received by client 116 before client 116 makes a request for notification records at block 804. In some embodiments where notification records are identified by serial number, client 116 can send a request that includes the serial number of the last notification record it has received, and server 202 can send any notification records for the user of client 116 that have serial numbers subsequent to the last-received serial number reported by the client. In some embodiments, time stamps can be used in addition to or instead of serial numbers for purposes of requesting notification records and/or identifying which records to provide.

At block 806, client 116 can receive one or more new notification records from server 202. In some embodiments, client 116 can store the new notification records together with any notification records it may previously have received.

In some embodiments, client 116 can consolidate notification records (including new and/or previously received records) that pertain to the same topic, e.g., by using some or all of topic fields 510 as a key. Accordingly, at block 808, client 116 can detect whether two or more notification records pertain to the same topic, e.g., by comparing topic fields 510. In some embodiments, notifications pertain to the same topic if (and only if) all of topic fields 510 match.

Where the topic fields 510 of two or more notification records match, client 116 can consolidate the records at block 810, e.g., based on some or all of sequence fields 512. For example, based on the serial number and/or timestamp associated with each record, client 116 can identify the most recent record and discard older records. In other instances, client 116 can sort and/or prioritize notification records pertaining to the same topic based on any information in sequence fields 512 and can select a subset (e.g., one) of the notification records pertaining to a given topic, discarding other records. Discarding a record can include, e.g., deleting it from storage on client 116 or marking it as obsolete. In some embodiments, a client's decision to discard a particular record affects only its local copy, not the record stored in notifications data store 210. In some embodiments, consolidation can include merging information from multiple records. For example, if client 116 receives five records each indicating that a user has uploaded a file to the same shared folder, the records can be consolidated to a single record indicating that five files have been uploaded to the shared folder.

At block 812, client 116 can display user-visible alerts based on the consolidated notification records. For example, referring to FIG. 5, if user Bob has received and read an invitation but not yet replied, client 116 can receive notification records 504 and 506 from server 202, either at the same time or at different times. Client 116 can consolidate these records, e.g., by discarding older record 504. Based on most-recent record 506, a user-visible alert can be generated to remind Bob that he has an outstanding invitation. Alternatively, since the status field of the record indicates that Bob has already read the invitation, client 116 can determine that no alert should be generated based on record 506. Whether an alert is generated for any particular notification record depends on the particular implementation of client 116 and may be driven in part by user preferences and settings.

It is to be understood that client 116 can take other actions based on received notification records, in addition to or instead of generating alerts. For example, client 116 may update a local file, change a setting, or perform other processes with or without alerting the user.

Process 800 can be executed repeatedly by client 116 (or other client), allowing client 116 to generate and update user alerts approximately in real time. In some embodiments, client 116 can display an alert feed (also referred to as a notification feed, or simply a feed) that is dynamically updated as new notification records are received and consolidated with previous records. For example, if Bob receives a shared folder invitation, an alert can be generated; that alert can be updated when Bob reads the invitation (e.g., to show that the invitation has been read but is still outstanding) and again when Bob accepts (or declines) the invitation. In some embodiments, the alert can disappear when the invitation is read or when it is accepted; in other embodiments, displayed text and/or other status indicators (e.g., colors, icons) associated with the alert can be dynamically modified to reflect the latest activity. For example, the alert can be presented in one color when the invitation is received; the color can change when the invitation is read; and when the invitation is accepted (or declined) the alert can disappear entirely or the text can change to indicate to Bob that he has acted on the invitation (e.g., "You have an invitation from Alice to share folder VacationPhotos" can be changed to "You accepted an invitation from Alice to share folder VacationPhotos"). In some embodiments, alert text and/or other properties of an alert can be determined based in part on topic fields 510 and/or content fields 514.

When a client starts up (e.g., when an application launches or when a browser client connects to the online content management service), the client may not have a current set of notification records. In some embodiments, when a client starts up, it can initialize its alert feed by executing process 800 starting from block 804, where the client can send a request to initialize its notification set. In response, server 202 can deliver a "startup" set of notification records. The startup set can be defined in various ways. For example, the startup set can include the ten (or some other number of) most recent notification records, or it can include all notification records within the last twelve hours or last day or some other time period.

Figure 9:
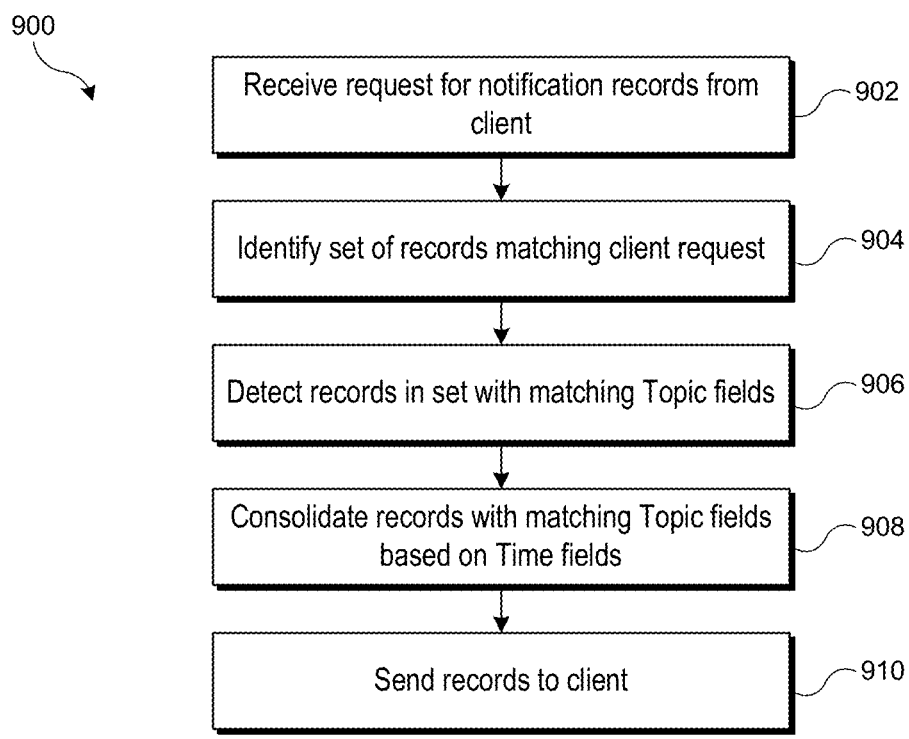
FIG. 9 shows a flow diagram of a process for providing notification records to a client according to an embodiment of the present invention

FIG. 9 is a flow diagram of a process 900 for providing notification records to a client, e.g., client 116 (or any of clients 110, 112, 114) according to an embodiment of the present invention. Process 900 can be implemented, e.g., on notification server 202.

At block 902, server 202 can receive a request from client 116 for notification records. In some embodiments, the request can include an identifier (e.g., serial number or serial number plus user ID) of a specific notification record to be retrieved. In other embodiments, the request can include an identifier of the most recent notification record the client has received and can request that the server provide all notification records that are more recent than the identified record. In some embodiments, the request can be a request for a startup set of notification records, e.g., as described above.

At block 904, server 202 can identify a set of notification records that match the client's request. Server 202 can send this set to the client, or in some embodiments, server 202 can consolidate the notification records prior to sending them. For example, at block 906, server 202 can detect whether two or more notification records pertain to the same topic, e.g., by comparing topic fields 510. In some embodiments, notifications pertain to the same topic if (and only if) all of topic fields 510 match. Where the topic fields 510 of two or more notification records match, server 202 can consolidate the records at block 908. For example, based on the serial number and/or timestamp associated with each record, server 202 can identify the most recent record and remove older records from the consolidated set. At block 910, server 202 can send the consolidated set of records to client 116. As another example, server 202 can generate a merged record reflecting information from multiple notification records in notification data store 210, e.g., a single record indicating that a user has uploaded multiple files to a particular folder rather than a separate record for each upload. It is to be understood that consolidation by server 202 at block 908 can affect the set of records sent to a particular client without modifying the contents of notification data store 210. Accordingly, the sequence of notification records sent to any one client need not be affected by sending of notification records to any other client, allowing each client to receive any notification it might request.

In some embodiments, consolidation by server 202 may be performed in an iterative manner. For example, as described above, client 116 may request a startup set of notification records that includes a fixed number (e.g., ten) of notification records. Server 202 can identify the ten most recent records for that client (e.g., based on the user ID associated with the client) at block 904. However, consolidation at block 908 may reduce the number of records, e.g., to six. Where this happens, server 202 can send the reduced set. Alternatively, server 202 can add more records to the set to bring the number back to ten, consolidate again, and repeat these actions until the number of records in the consolidated set reaches ten (or other fixed number as desired).

In some instances, server 202 may determine that there are no notification records to be sent in response to a request, in which case, server 202 can return a response to client 116 indicating this condition.

It will be appreciated that processes 700, 800 and 900 are illustrative and that variations and modifications are possible. Steps described as sequential may be executed in parallel, order of steps may be varied, and steps may be modified, combined, added or omitted. Used together, processes 700, 800 and 900 (or similar processes) can allow clients to provide a real-time notification feed that presents current information to a user and that updates (e.g., overwrites or removes) obsolete information. The feed can be presented on any or all of a user's clients, and feeds on each platform are automatically updated (approximately in real time) based on activity on any client. Since delivery of notification records to any one client is independent of delivery to any other client, each of a user's clients can receive all notifications and can present a complete and current alert feed, and user interactions with one client can be reflected in the feeds presented on other clients.

While the invention has been described with respect to specific embodiments, one skilled in the art will recognize that numerous modifications are possible. For example, the particular events, data structures, and platforms described herein are used for purposes of illustration; other events, data structures, and platforms can be substituted. Techniques for pushing messages to clients can also be modified as appropriate for a particular client.

As noted above, it is not required that every notification result in an alert on all clients or even any clients. Where a notification does result in an alert, the alert can be presented to a user in any manner desired; an alert can incorporate visual elements (text, icons or images, colors, etc.), audible elements (tones, spoken words, etc.), tactile elements (vibrating or pulsing, etc.), and/or any other perceptible element or elements.

Embodiments described above may make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method executable at a server, the method comprising:
receiving, at the server, from a client device, a request for new notification records;
retrieving, by the server, from a notifications data store, an initial set of notification records responsive to the request, the initial set of notification records including a first notification record and a second notification record, wherein each of the notification records in the initial set of notification records includes a topic field, a sequence field, and a content field;
generating, by the server, a final set of notification records from the initial set of notification records, wherein generating the final set of notification records includes:
determining, by the server, based on the topic fields of the notification records, whether the first notification record should be consolidated with the second notification record, wherein the first notification record and the second notification record should be consolidated if the topic fields of the first notification record and the second notification record match; and
in the event that the first notification record should be consolidated with the second notification record, consolidating, by the server, the first notification record with the second notification record based on the sequence fields of the first notification record and the second notification record,
wherein consolidating the first notification record with the second notification record includes replacing the first notification record and the second notification record with a single consolidated notification record in the final set of notification records, the single consolidated notification record including the topic field and the sequence field of the second notification record and further including a content field based at least in part on the content field of the second notification record; and
sending, by the server, the final set of notification records to the client device.

2. The method of claim 1 wherein the sequence field of each notification record includes a temporal order indicator and wherein consolidating the first notification record with the second notification record includes:
identifying, based on the temporal order indicators, that the first notification record is older than the second notification record; and
removing the first notification record from the final set of notification records, wherein the second notification record becomes the single consolidated notification record.

3. The method of claim 2 wherein the temporal order indicator of each notification record includes a serial number.

4. The method of claim 2 wherein the temporal order indicator of each notification record includes a time stamp.

5. The method of claim 1 wherein consolidating the first notification record with the second notification record does not affect the notifications data store.

6. A method executable at a client operated by a user, the method comprising:
   requesting, by the client, notification records from a server;
   receiving, by the client, from the server, one or more notification records responsive to the request;
   identifying, by the client, an initial set of notification records to process, the initial set of notification records including the one or more notification records received from the server, wherein each of the notification records includes a topic field, a sequence field, and a content field;
   generating, by the client, a final set of notification records from the initial set of notification records,
   wherein generating the final set of notification records includes consolidating a first notification record in the initial set with a second notification record in the initial set in the event that the topic field of the first notification record matches the topic field of the second notification record,
   wherein consolidating the first notification record with the second notification record includes replacing the first notification record and the second notification record with a single consolidated notification record in the final set of notification records, the single consolidated notification record including the topic field and the sequence field of the second notification record and a content field based at least in part on the content field of the second notification record; and
   presenting one or more alerts based on the final set of notification records.

7. The method of claim 6 wherein the initial set of notification records further includes one or more other notification records that were present at the client prior to requesting the notification records from the server.

8. The method of claim 6 further comprising:
   receiving a message from the server indicating that at least one new notification record is available,
   wherein requesting the notification records is done in response to receiving the message.

9. The method of claim 6 wherein the topic field of each notification record in the final set is different from the topic field of each other notification record in the final set.

10. The method of claim 6 wherein consolidating the first notification record with the second notification record includes:
    comparing the sequence field of the first notification record with the sequence field of the second notification record; and
    removing the first notification record from the final set of notification records based on a result of comparing the sequence fields.

11. The method of claim 6 wherein presenting the one or more alerts includes presenting a feed that includes the one or more alerts.

12. A method executable at a server, the method comprising:
    receiving, at the server, from another device participating in an online content management service, event information pertaining to an event associated with a target user of the online content management service;
    creating, by the server, a first notification record based on the event information, the first notification record including a topic field, a sequence field, and a content field, the topic field being usable to identify a plurality of notification records from the notifications data store that pertain to a same topic, the sequence field being usable to sort notification records that pertain to the same topic into a sort order;
    storing, by the server, the first notification record in a notifications data store;
    generating, by the server, a first message indicating that the first notification record is available in the notifications data store, the first message including an identifier of the target user and an identifier of the first notification record, the identifier of the first notification record being usable by a recipient of the first message to obtain the first notification record from the notifications data store; and
    promulgating, by the server, the first message to a plurality of clients associated with the target user, wherein promulgation of the first message to each of the clients is independent of promulgation of the first message to any other of the clients.

13. The method of claim 12 further comprising:
    receiving from a first one of the plurality of client devices a request for new notification records;
    identifying an initial set of notification records responsive to the request, the set of notification records including the first notification record;
    generating a final set of notification records from the initial set of notification records,
    wherein generating the final set of notification records includes consolidating the first notification record with another notification record in the initial set in the event that the topic field of the first notification record matches the topic field of the other notification record; and
    sending the final set of notification records to the first one of the plurality of client devices.

14. The method of claim 13 wherein consolidating the first notification record with the other notification record includes:
    comparing the sequence field of the first notification record with a sequence field of the other notification record; and
    removing one of the first notification record and the other notification record from the final set of notification records based on a result of comparing the sequence fields.

15. The method of claim 14 wherein comparing the sequence field of the first notification record with a sequence field of the other notification record includes identifying which of the first notification record and the second notification record is older, and wherein the older of the first notification record and the second notification record is removed from the final set of notification records.

16. A server system comprising:
    a notifications data store; and
    a processor coupled to the notifications data store and configured to:
    receive, from a client device, a request for new notification records;
    retrieve, from a notifications data store, an initial set of notification records responsive to the request, each of the notification records including a topic field, a sequence field, and a content field;
    generate a final set of notification records from the initial set of notification records, wherein generating the final set of notification records includes consolidating two or more notification records from the initial set in the event that the two or more notification records have matching topic fields, wherein consolidating the two or more notification records includes replacing the two or more notification records with a single consolidated notification record in the final set of notification records, the single consolidated notification record including the topic field and the sequence field of one of the two or more notification record and a content field based on the content fields of at least one of the two or more notification records; and send the final set of notification records to the client device.

17. The server system of claim 16 wherein each of the notification records corresponds to an event, and wherein the topic field of each of the notification records includes:

a type identifier indicative of an event type of the event;

a target object identifier indicative of an object acted upon during the event; and a target user identifier indicative of a target user to be notified of the event.

18. The server system of claim 17 wherein the request received from the client device includes a client user identifier and wherein the initial set of notification records includes only notification records for which the target user identifier matches the client user identifier.

19. The server system of claim 17 wherein the processor is further configured to consolidate two or more notification records only if each of the type identifier, the target object identifier, and the target user identifier are the same.

20. A client comprising:

a data communications interface;

a user interface; and a processor coupled to the data communications interface and the user interface, the processor being configured to:

receive, from a server, one or more notification records, wherein each of the notification records includes a topic field, a sequence field, and a content field;

identify an initial set of notification records to process, the initial set of notification records including the one or more notification records received from the server;

generate a final set of notification records from the initial set of notification records, wherein generating the final set of notification records includes consolidating two or more notification records for which the topic fields match, wherein consolidating the two or more notification records includes replacing the two or more notification records with a single consolidated notification record in the final set of notification records, the single consolidated notification record including the topic field and the sequence field of one of the two or more notification record and a content field based on the content fields of at least one of the two or more notification records; and present one or more alerts based on the final set of notification records.

21. The client of claim 20 wherein each of the notification records corresponds to an event, and wherein the topic field of each of the notification records includes:

a type identifier indicative of an event type of the event;

a target object identifier indicative of an object acted upon during the event; and a target user identifier indicative of a target user to be notified of the event.

22. The client of claim 20 wherein two or more notification records are consolidated if each of the type identifier, the target object identifier, and the target user identifier are the same.

23. A server system comprising:

a notifications data store; and a processor coupled to the notifications data store and configured to receive, from another device participating in an online content management service, event information pertaining to an event associated with a target user of the online content management service;

create a notification record based on the event information, the notification record including a topic field, a sequence field, and a content field, the topic field being usable to identify a plurality of notification records from the notifications data store that pertain to a same topic, the sequence field being usable to sort notification records that pertain to the same topic into a sort order;

store the notification record in the notifications data store;

generate a message indicating that the notification record is available in the notifications data store, the message including an identifier of the target user and an identifier of the notification record, the identifier of the notification record being usable by a recipient of the message to obtain the notification record from the notifications data store; and promulgate the message to a plurality of clients associated with the target user, wherein promulgation of the message to each of the clients is independent of promulgation of the message to any other of the clients.

24. The server system of claim 23 wherein the sequence field includes a serial number and wherein the serial number is included in the first message as the identifier of the first notification record.

25. The server system of claim 23 wherein the topic field includes one or more of:

a type identifier indicative of the event type;

a target object identifier indicative of an object acted upon during the event; or the identifier of the target user.

26. The server system of claim 23 wherein the sequence field includes:

a serial number assigned by the server in a monotonically increasing order; and a send time indicative of a time of creation of the first notification record.

27. The server system of claim 23 wherein promulgating the message to the plurality of clients includes:

writing the message to a message queue that is readable by each of a plurality of message dispatchers, wherein each message dispatcher is configured to read the message and generate a corresponding client-specific message for delivery to one or more or of the plurality of clients.

* * * * *